US012566956B2

(12) United States Patent
Chen et al.

(10) Patent No.:     US 12,566,956 B2
(45) Date of Patent:          Mar. 3, 2026

(54) METHOD, SYSTEM, AND COMPUTER PROGRAM PRODUCT FOR GENERATING ROBUST GRAPH NEURAL NETWORKS USING UNIVERSAL ADVERSARIAL TRAINING

(71) Applicant: Visa International Service Association, San Francisco, CA (US)

(72) Inventors: Huiyuan Chen, San Jose, CA (US); Fei Wang, Fremont, CA (US); Hao Yang, San Jose, CA (US)

(73) Assignee: Visa International Service Association, San Francisco, CA (US)

( * ) Notice:     Subject to any disclaimer, the term of this patent is extended or adjusted under 35 U.S.C. 154(b) by 43 days.

(21) Appl. No.:     18/286,799

(22) PCT Filed:     Feb. 17, 2023

(86) PCT No.:     PCT/US2023/013290
§ 371 (c)(1),
(2) Date:     Oct. 13, 2023

(87) PCT Pub. No.: WO2023/158786
PCT Pub. Date: Aug. 24, 2023

(65)          Prior Publication Data
US 2024/0095526 A1     Mar. 21, 2024

Related U.S. Application Data

(60) Provisional application No. 63/311,620, filed on Feb. 18, 2022.

(51) Int. Cl.
*G06N 3/08*          (2023.01)
(52) U.S. Cl.
CPC ...................................... *G06N 3/08* (2013.01)

(58) Field of Classification Search
CPC ............ G06N 20/00; G06N 3/04; G06N 5/04; G06N 3/08; G06N 3/02; G06N 5/02; G06N 3/042; G06N 3/0475
See application file for complete search history.

(56)          References Cited

U.S. PATENT DOCUMENTS

| | | |
|---|---|---|
| 2021/0034737 A1 | 2/2021 | Khan et al. |
| 2021/0110436 A1 | 4/2021 | Sankar et al. |

(Continued)

FOREIGN PATENT DOCUMENTS

| | | |
|---|---|---|
| WO | 2021165887 A1 | 4/2021 |

OTHER PUBLICATIONS

Jin et al., Robust Training of Graph Convolutional Networks via Latent Perturbation, 2021 (Year: 2021).*

(Continued)

*Primary Examiner* — David Yi
(74) *Attorney, Agent, or Firm* — The Webb Law Firm

(57)          ABSTRACT

Described are a method, system, and computer program product for generating robust graph neural networks using universal adversarial training. The method includes receiving a graph neural network (GNN) model and a bipartite graph including an adjacency matrix, initializing model parameters of the GNN model, initializing perturbation parameters, and sampling a subgraph of a complementary graph based on the bipartite graph. The method further includes repeating until convergence of the model parameters: drawing a random variable from a uniform distribution; generating a universal perturbation matrix based on the subgraph, the random variable, and the perturbation parameters; determining Bayesian Personalized Ranking (BPR) loss by inputting the bipartite graph and the universal perturbation matrix to the GNN model; updating the perturbation parameters based on stochastic gradient ascent; and (Continued)

300 updating the model parameters based on stochastic gradient descent. The method further includes, in response to convergence of the model parameters, outputting the model parameters.

24 Claims, 4 Drawing Sheets

(56) References Cited

U.S. PATENT DOCUMENTS

| | | |
|---|---|---|
| 2021/0142177 A1 | 5/2021 | Mallya et al. |
| 2021/0374499 A1 | 12/2021 | Wu et al. |

OTHER PUBLICATIONS

Liu et al., Contrastive Learning for Recommender System, 2021 (Year: 2021).*

Zhang et al., Reverse Attack: Black-box Attacks on Collaborative Recommendation, 2021 (Year: 2021).*

Andrews et al., Structured Prediction of Generalized Matching Graphs, 2008 (Year: 2008).*

Madry et al., Towards Deep Learning Models Resistant to Adversarial Attacks, 2019 (Year: 2019).*

He et al. "Adversarial Personalized Ranking for Recommendation" (Year: 2018).*

Boluki et al., "Learnable Bernoulli Dropout for Bayesian Deep Learning", International Conference on Artificial Intelligence and Statistics, 2020, pp. 1-11.

Casella et al., "Rao-Blackwellization of Sampling Schemes", Biometrics Unit, Cornell University, 1994, pp. 1-26.

Dai et al., "Adversarial Attack on Graph Structured Data", 35th International Conference on Machine Learning, 2018, pp. 1-10.

Dai et al., "Adversarial training methods for network embedding", Proceedings of the 2019 World Wide Web Conference, 2019, pp. 1-11.

Deng et al., "Batch virtual adversarial training for graph convolutional networks", 2019 Workshop on Learning and Reasoning with Graph-Structured Data, 2019, pp. 1-8.

Dimitriev et al., "ARMS: Antithetic-Reinforce-Multi-Sample Gradient for Binary Variables", International Conference on Machine Learning, 2021, pp. 1-21.

Dong et al., "DisARM: An Antithetic Gradient Estimator for Binary Latent Variables", 34th Conference on Neural Information Processing Systems, 2020, pp. 1-20.

Dong et al., "Coupled Gradient Estimators for Discrete Latent Variables", 35th Conference on Neural Information Processing Systems, 2021, pp. 1-11.

Feng et al., "Graph Adversarial Training: Dynamically Regularizing Based on Graph Structure", IEEE Transactions on Knowledge and Data Engineering, 2019, pp. 1-12.

Goodfellow et al., "Explaining and Harnessing Adversarial Examples", International Conference on Learning Representations, 2015, pp. 1-11.

He et al., "Adversarial Personalized Ranking for Recommendation", The 41st International ACM SIGIR Conference on Research & Development in Information Retrieval, 2018, pp. 1-10.

He et al., "LightGCN: Simplifying and Powering Graph Convolution Network for Recommendation", Proceedings of the 43rd International ACM SIGIR Conference on Research and Development in Information Retrieval, 2020, pp. 1-10.

He et al., "Neural Collaborative Filtering", Proceedings of the 26th International Conference on World Wide Web, 2017, pp. 1-10.

Jang et al., "Categorical Reparameterization with Gumbel-Softmax", International Conference on Learning Representations, 2017, pp. 1-13.

Jin et al., "Latent Adversarial Training of Graph Convolution Networks", ICML Workshop on Learning and Reasoning with Graph-Structured Representations, 2019, pp. 1-7.

Jin et al., "Graph Structure Learning For Robust Graph Neural Networks", Proceedings of the 26th ACM SIGKDD International Conference on Knowledge Discovery & Data Mining, 2020, pp. 1-9.

Kipf et al., "Semi-Supervised Classification with Graph Convolutional Networks", International Conference on Learning Representations, 2017, pp. 1-14.

Kong et al., "Flag: Adversarial data augmentation for graph neural networks", 2020, pp. 1-14.

Lorberbom et al., "Direct Optimization through Argmax for Discrete Variational Auto-Encoder", Advances in Neural Information Processing Systems, 2019, pp. 1-12.

Lyu et al., "AutoShuffleNet: Learning Permutation Matrices via an Exact Lipschitz Continuous Penalty in Deep Convolutional Neural Networks", KDD'20, 2020, Virtual Event, pp. 608-616.

Madry et al., "Towards Deep Learning Models Resistant to Adversarial Attacks", International Conference on Learning Representations, 2018, pp. 1-28.

Moosavi-Dezfooli et al., "Universal Adversarial Perturbations", Proceedings of the IEEE Conference on Computer Vision and Pattern Recognition, 2017, pp. 1765-1773.

Rendle et al., "BPR: Bayesian Personalized Ranking from Implicit Feedback", Proceedings of the Twenty-Fifth Conference on Uncertainty in Artificial Intelligence, 2009, pp. 452-461.

Ross et al., "Introduction to Probability Models", Academic Press, 2014, pp. 1-767.

Shafahi et al., "Universal adversarial training", Proceedings of the AAAI Conference on Artificial Intelligence., 2020, pp. 5636-5643.

Suresh et al., "Adversarial Graph Augmentation to Improve Graph Contrastive Learning", Advances in Neural Information Processing Systems, 2021, pp. 1-14.

Wang et al., "Neural graph collaborative filtering", Proceedings of the 42nd international ACM SIGIR Conference on Research and Development in Information Retrieval., 2019, pp. 1-10.

Wang et al., "On the Convergence and Robustness of Adversarial Training", International Conference on Machine Learning, 2019, pp. 1-10.

Williams et al., "Simple Statistical Gradient-Following Algorithms for Connectionist Reinforcement Learning", Machine learning, 1992, pp. 230-256.

Wu et al., "Simplifying Graph Convolutional Networks", International Conference on Machine Learning, 2019, pp. 1-11.

Xu et al., "Topology Attack and Defense for Graph Neural Networks: An Optimization Perspective", Proceedings of the 28th International Joint Conference on Artificial Intelligence, 2019, pp. 1-7.

Yin et al., "ARM: Augment-Reinforce-Merge Gradient for Stochastic Binary Networks", International Conference on Learning Representations, 2019, pp. 1-21.

Ying et al., "Graph Convolutional Neural Networks for Web-Scale Recommender Systems", Proceedings of the 24th ACM SIGKDD International Conference on Knowledge Discovery & Data Mining, 2018, pp. 1-10.

Ying et al., "GNNExplainer: Generating Explanations for Graph Neural Networks", Advances in Neural Information Processing Systems, 2019, pp. 1-12.

Zhang et al., "GNNGUARD: Defending Graph Neural Networks Against Adversarial Attacks", 34th Conference on Neural Information Processing Systems (NeurIPS 2020), 2020, pp. 1-13.

Zhou et al., "Negative Binomial Process Count and Mixture Modeling", IEEE Transactions on Pattern Analysis and Machine Intelligence, 2013, pp. 1-14.

Zugner et al., "Adversarial attacks on neural Networks for Graph Data", Proceedings of the 24th ACM SIGKDD International Conference on Knowledge Discovery & Data Mining, 2018, pp. 1-15.

Zugner et al., "Adversarial Attacks on Graph Neural Networks via Meta Learning", International Conference on earning Representations, 2018, pp. 2847-2856.

Huang et al., "MixGCF: An Improved Training Method for Graph Neural NetworkObased Recommender Systems", In Proceedings of the 27th ACM SIGKDD Conference on Knowledge Discovery & Data Mining, 2021, pp. 665-674.

(56) References Cited

OTHER PUBLICATIONS

Wei et al., "Contrastive Meta Learning with Behavior Multiplicity for Recommendation", In Proceedings of the fifteenth ACM international conference on web search and data mining, 2022, pp. 1120-1128.
Wu et al., "Self-supervised Graph Learning for Recommendation", In Proceedings of the 44th international ACM SIGIR conference on research and development in information retrieval, 2021, pp. 726-735.

* cited by examiner

100

<u>300</u>

302  Receive input of GNN model and bipartite graph

304  Initialize model parameters

306  Initialize perturbation parameters

308  Determine complementary graph based on bipartite graph

310  Sample subgraph of complementary graph

312  Repeat process 400 until convergence of model parameters (FIG. 4)

314  Output model parameters

400

402 — Draw random variable from uniform distribution

404 — Generate universal perturbation matrix

406 — Determine BPR loss

408 — Update perturbation parameters

410 — Update model parameters

412 — Convergence?

No

Yes

METHOD, SYSTEM, AND COMPUTER PROGRAM PRODUCT FOR GENERATING ROBUST GRAPH NEURAL NETWORKS USING UNIVERSAL ADVERSARIAL TRAINING

CROSS REFERENCE TO RELATED APPLICATIONS

This application is the United States national phase of International Application No. PCT/US2023/013290 filed Feb. 17, 2023, and claims priority to U.S. Provisional Patent Application No. 63/311,620, filed Feb. 18, 2022, the disclosures of which are incorporated by reference herein in their entirety.

BACKGROUND

1. Technical Field

This disclosure relates generally to adversarial training for neural networks and, in some non-limiting embodiments or aspects, to methods, systems, and computer program products for generating robust graph neural networks that are resilient to perturbations by using universal adversarial training.

2. Technical Considerations

Graph neural networks (GNNs) provide a class of powerful architectures that are extremely effective for graph-based collaborative filtering. Nevertheless, GNNs are vulnerable to perturbations (e.g., additions, modifications, deletions, missing edges, erroneously included edges, etc.) on nodes' features or graph structures (e.g., edgewise connections to other nodes). Perturbations can catastrophically reduce the performance (e.g., accuracy, efficiency, etc.) of GNNs. Underperforming GNNs, caused by perturbations, may require additional layers of training, require combination with other neural networks to provide ensemble analysis, or require additional post-generation testing in order to provide the level of performance required in a given system implementation. Each of the above remedies increase computer system requirements (e.g., processing capacity, required memory storage, processing time, bandwidth, etc.) and could be avoided if the underlying GNN was generated to be robust and resilient to perturbations.

Accordingly, there is a need in the art for a technical solution that provides for generating robust GNNs that are resilient to perturbations, such that computer resources required with producing high-performing GNNs can be minimized.

SUMMARY

According to some non-limiting embodiments or aspects, provided are methods, systems, and computer program products for generating robust GNNs using universal adversarial training that overcome some or all of the deficiencies identified above.

According to some non-limiting embodiments or aspects, provided is a computer-implemented method for generating robust GNNs using universal adversarial training. The method includes receiving, with at least one processor, input including a GNN model and a bipartite graph including an adjacency matrix determined from an interaction matrix. The method also includes initializing, with at least one processor, model parameters of the GNN model based on a Bayesian Personalized Ranking (BPR) loss. The method further includes initializing, with at least one processor, perturbation parameters randomly. The method further includes determining, with at least one processor, a complementary graph based on the bipartite graph. The method further includes sampling, with at least one processor, a subgraph of the complementary graph. The method further includes repeating, with at least one processor, until convergence of the model parameters: drawing a random variable from a uniform distribution; generating a universal perturbation matrix based on the subgraph, the random variable, and the perturbation parameters; determining BPR loss by inputting the bipartite graph and the universal perturbation matrix to the GNN model; updating the perturbation parameters based on stochastic gradient ascent; and updating the model parameters based on stochastic gradient descent. The method further includes, in response to convergence of the model parameters, outputting, with at least one processor, the model parameters.

In some non-limiting embodiments or aspects, the method may further include, in response to convergence of the model parameters, generating, with at least one processor, the at least one recommendation based on the interaction matrix by executing the GNN model using the model parameters.

In some non-limiting embodiments or aspects, the input may further include a perturbations budget, wherein the perturbations budget specifies a number of edges of the subgraph.

In some non-limiting embodiments or aspects, the input may further include a first regularized parameter, wherein the BPR loss is based on the first regularized parameter to prevent overfitting.

In some non-limiting embodiments or aspects, the input may further include a second regularized parameter, wherein an effect of adversarial perturbations of the universal perturbation matrix on the BPR loss is limited by the second regularized parameter.

In some non-limiting embodiments or aspects, the input may further include a third regularized parameter, wherein the universal perturbation matrix is generated as a sparse graph by using a learnable binary mask that is weighted with the third regularized parameter.

In some non-limiting embodiments or aspects, the interaction matrix may be a user-item interaction matrix, wherein the GNN model is trained to generate at least one item recommendation for at least one user based on the user-item interaction matrix.

In some non-limiting embodiments or aspects, the generation of the universal perturbation matrix may be further based on a sigmoid function of the perturbation parameters.

In some non-limiting embodiments or aspects, the update of the model parameters based on stochastic gradient descent may be further based at least partly on BPR loss.

According to some non-limiting embodiments or aspects, provided is a system for generating robust GNNs using universal adversarial training. The system includes at least one processor that is programmed or configured to receive input including a GNN model and a bipartite graph including an adjacency matrix determined from an interaction matrix. The at least one processor is also programmed or configured to initialize model parameters of the GNN model based on a Bayesian Personalized Ranking (BPR) loss. The at least one processor is further programmed or configured to initialize perturbation parameters randomly. The at least one processor is further programmed or configured to determine a complementary graph based on the bipartite graph. The at least one processor is further programmed or configured to sample a subgraph of the complementary graph. The at least one processor is further programmed or configured to repeat until convergence of the model parameters: draw a random variable from a uniform distribution; generate a universal perturbation matrix based on the subgraph, the random variable, and the perturbation parameters; determine BPR loss by inputting the bipartite graph and the universal perturbation matrix to the GNN model; update the perturbation parameters based on stochastic gradient ascent; and update the model parameters based on stochastic gradient descent. The at least one processor is further programmed or configured to, in response to convergence of the model parameters, output the model parameters.

In some non-limiting embodiments or aspects, the at least one processor is further programmed or configured to, in response to convergence of the model parameters, generate at least one recommendation based on the interaction matrix by executing the GNN model using the model parameters.

In some non-limiting embodiments or aspects, the input may further include a perturbations budget, and the perturbations budget may specify a number of edges of the subgraph.

In some non-limiting embodiments or aspects, the input may further include a first regularized parameter, and the BPR loss may be based on the first regularized parameter to prevent overfitting.

In some non-limiting embodiments or aspects, the input may further include a second regularized parameter, and an effect of adversarial perturbations of the universal perturbation matrix on the BPR loss may be limited by the second regularized parameter.

In some non-limiting embodiments or aspects, the input may further include a third regularized parameter, and the universal perturbation matrix may be generated as a sparse graph by using a learnable binary mask that is weighted with the third regularized parameter.

In some non-limiting embodiments or aspects, the interaction matrix may include a user-item interaction matrix, and the GNN model may be trained to generate at least one item recommendation for at least one user based on the user-item interaction matrix.

In some non-limiting embodiments or aspects, the generation of the universal perturbation matrix may be further based on a sigmoid function of the perturbation parameters.

In some non-limiting embodiments or aspects, the update of the model parameters based on stochastic gradient descent may be further based at least partly on BPR loss.

According to some non-limiting embodiments or aspects, provided is a computer program product for generating robust GNNs using universal adversarial training. The computer program product includes at least one non-transitory computer-readable medium including one or more instructions that, when executed by at least one processor, cause the at least one processor to receive input including a GNN model and a bipartite graph including an adjacency matrix determined from an interaction matrix. The one or more instructions also cause the at least one processor to initialize model parameters of the GNN model based on a Bayesian Personalized Ranking (BPR) loss. The one or more instructions further cause the at least one processor to initialize perturbation parameters randomly. The one or more instructions further cause the at least one processor to determine a complementary graph based on the bipartite graph. The one or more instructions further cause the at least one processor to sample a subgraph of the complementary graph. The one or more instructions further cause the at least one processor to repeat until convergence of the model parameters: draw a random variable from a uniform distribution; generate a universal perturbation matrix based on the subgraph, the random variable, and the perturbation parameters; determine BPR loss by inputting the bipartite graph and the universal perturbation matrix to the GNN model; update the perturbation parameters based on stochastic gradient ascent; and update the model parameters based on stochastic gradient descent. The one or more instructions further cause the at least one processor to, in response to convergence of the model parameters, output the model parameters.

In some non-limiting embodiments or aspects, the one or more instructions may cause the at least one processor to, in response to convergence of the model parameters, generate at least one recommendation based on the interaction matrix by executing the GNN model using the model parameters.

In some non-limiting embodiments or aspects, the input may further include a perturbations budget, and the perturbations budget may specify a number of edges of the subgraph.

In some non-limiting embodiments or aspects, the input may further include a first regularized parameter, and the BPR loss may be based on the first regularized parameter to prevent overfitting.

In some non-limiting embodiments or aspects, the input may further include a second regularized parameter, and an effect of adversarial perturbations of the universal perturbation matrix on the BPR loss may be limited by the second regularized parameter.

In some non-limiting embodiments or aspects, the input may further include a third regularized parameter, and the universal perturbation matrix may be generated as a sparse graph by using a learnable binary mask that is weighted with the third regularized parameter.

In some non-limiting embodiments or aspects, the interaction matrix may include a user-item interaction matrix, and the GNN model may be trained to generate at least one item recommendation for at least one user based on the user-item interaction matrix.

In some non-limiting embodiments or aspects, the generation of the universal perturbation matrix may be further based on a sigmoid function of the perturbation parameters.

In some non-limiting embodiments or aspects, the update of the model parameters based on stochastic gradient descent may be further based at least partly on BPR loss.

Further non-limiting embodiments or aspects will be set forth in the following numbered clauses:

Clause 1: A computer-implemented method comprising: receiving, with at least one processor, input comprising a graph neural network (GNN) model and a bipartite graph comprising an adjacency matrix determined from an interaction matrix; initializing, with at least one processor, model parameters of the GNN model based on a Bayesian Personalized Ranking (BPR) loss; initializing, with at least one processor, perturbation parameters randomly; determining, with at least one processor, a complementary graph based on the bipartite graph; sampling, with at least one processor, a subgraph of the complementary graph; repeating, with at least one processor, until convergence of the model parameters: drawing a random variable from a uniform distribution; generating a universal perturbation matrix based on the subgraph, the random variable, and the perturbation parameters; determining BPR loss by inputting the bipartite graph and the universal perturbation matrix to the GNN model; updating the perturbation parameters based on stochastic gradient ascent; and updating the model parameters based on stochastic gradient descent; and, in response to convergence of the model parameters, outputting, with at least one processor, the model parameters.

Clause 2: The computer-implemented method of clause 1, further comprising, in response to convergence of the model parameters, generating, with at least one processor, at least one recommendation based on the interaction matrix by executing the GNN model using the model parameters.

Clause 3: The computer-implemented method of clause 1 or clause 2, wherein the input further comprises a perturbations budget, and wherein the perturbations budget specifies a number of edges of the subgraph.

Clause 4: The computer-implemented method of any of clauses 1-3, wherein the input further comprises a first regularized parameter, and wherein the BPR loss is based on the first regularized parameter to prevent overfitting.

Clause 5: The computer-implemented method of any of clauses 1-4, wherein the input further comprises a second regularized parameter, and wherein an effect of adversarial perturbations of the universal perturbation matrix on the BPR loss is limited by the second regularized parameter.

Clause 6: The computer-implemented method of any of clauses 1-5, wherein the input further comprises a third regularized parameter, and wherein the universal perturbation matrix is generated as a sparse graph by using a learnable binary mask that is weighted with the third regularized parameter.

Clause 7: The computer-implemented method of any of clauses 1-6, wherein the interaction matrix comprises a user-item interaction matrix, and wherein the GNN model is trained to generate at least one item recommendation for at least one user based on the user-item interaction matrix.

Clause 8: The computer-implemented method of any of clauses 1-7, wherein the generation of the universal perturbation matrix is further based on a sigmoid function of the perturbation parameters.

Clause 9: The computer-implemented method of any of clauses 1-8, wherein the update of the model parameters based on stochastic gradient descent is further based at least partly on BPR loss.

Clause 10: A system comprising at least one processor, the at least one processor being programmed or configured to: receive input comprising a graph neural network (GNN) model and a bipartite graph comprising an adjacency matrix determined from an interaction matrix; initialize model parameters of the GNN model based on a Bayesian Personalized Ranking (BPR) loss; initialize perturbation parameters randomly; determine a complementary graph based on the bipartite graph; sample a subgraph of the complementary graph; repeat until convergence of the model parameters: draw a random variable from a uniform distribution; generate a universal perturbation matrix based on the subgraph, the random variable, and the perturbation parameters; determine BPR loss by inputting the bipartite graph and the universal perturbation matrix to the GNN model; update the perturbation parameters based on stochastic gradient ascent; and update the model parameters based on stochastic gradient descent; and, in response to convergence of the model parameters, output the model parameters.

Clause 11: The system of clause 10, wherein the at least one processor is further programmed or configured to, in response to convergence of the model parameters, generate at least one recommendation based on the interaction matrix by executing the GNN model using the model parameters.

Clause 12: The system of clause 10 or clause 11, wherein the input further comprises a perturbations budget, and wherein the perturbations budget specifies a number of edges of the subgraph.

Clause 13: The system of any of clauses 10-12, wherein the input further comprises a first regularized parameter, and wherein the BPR loss is based on the first regularized parameter to prevent overfitting.

Clause 14: The system of any of clauses 10-13, wherein the input further comprises a second regularized parameter, and wherein an effect of adversarial perturbations of the universal perturbation matrix on the BPR loss is limited by the second regularized parameter.

Clause 15: The system of any of clauses 10-14, wherein the input further comprises a third regularized parameter, and wherein the universal perturbation matrix is generated as a sparse graph by using a learnable binary mask that is weighted with the third regularized parameter.

Clause 16: The system of any of clauses 10-15, wherein the interaction matrix comprises a user-item interaction matrix, and wherein the GNN model is trained to generate at least one item recommendation for at least one user based on the user-item interaction matrix.

Clause 17: The system of any of clauses 10-16, wherein the generation of the universal perturbation matrix is further based on a sigmoid function of the perturbation parameters.

Clause 18: The system of any of clauses 10-17, wherein the update of the model parameters based on stochastic gradient descent is further based at least partly on BPR loss.

Clause 19: A computer program product comprising at least one non-transitory computer-readable medium including one or more instructions that, when executed by at least one processor, cause the at least one processor to: receive input comprising a graph neural network (GNN) model and a bipartite graph comprising an adjacency matrix determined from an interaction matrix; initialize model parameters of the GNN model based on a Bayesian Personalized Ranking (BPR) loss; initialize perturbation parameters randomly; determine a complementary graph based on the bipartite graph; sample a subgraph of the complementary graph; repeat until convergence of the model parameters: draw a random variable from a uniform distribution; generate a universal perturbation matrix based on the subgraph, the random variable, and the perturbation parameters; determine BPR loss by inputting the bipartite graph and the universal perturbation matrix to the GNN model; update the perturbation parameters based on stochastic gradient ascent; and update the model parameters based on stochastic gradient descent; and, in response to convergence of the model parameters, output the model parameters.

Clause 20: The computer program product of clause 19, wherein the one or more instructions cause the at least one processor to, in response to convergence of the model parameters, generate at least one recommendation based on the interaction matrix by executing the GNN model using the model parameters.

Clause 21: The computer program product of clause 19 or clause 20, wherein the input further comprises a perturbations budget, and wherein the perturbations budget specifies a number of edges of the subgraph.

Clause 22: The computer program product of any of clauses 19-21, wherein the input further comprises a first regularized parameter, and wherein the BPR loss is based on the first regularized parameter to prevent overfitting.

Clause 23: The computer program product of any of clauses 19-22, wherein the input further comprises a second regularized parameter, and wherein an effect of adversarial perturbations of the universal perturbation matrix on the BPR loss is limited by the second regularized parameter.

Clause 24: The computer program product of any of clauses 19-23, wherein the input further comprises a third regularized parameter, and wherein the universal perturbation matrix is generated as a sparse graph by using a learnable binary mask that is weighted with the third regularized parameter.

Clause 25: The computer program product of any of clauses 19-24, wherein the interaction matrix comprises a user-item interaction matrix, and wherein the GNN model is trained to generate at least one item recommendation for at least one user based on the user-item interaction matrix.

Clause 26: The computer program product of any of clauses 19-25, wherein the generation of the universal perturbation matrix is further based on a sigmoid function of the perturbation parameters.

Clause 27: The computer program product of any of clauses 19-26, wherein the update of the model parameters based on stochastic gradient descent is further based at least partly on BPR loss.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which.

Figure 1:
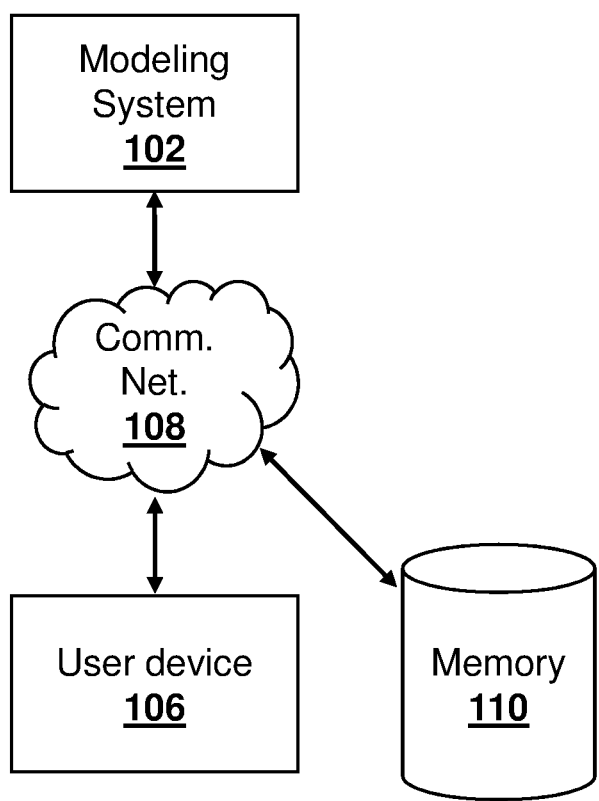
FIG. 1 is a schematic diagram of a system for generating robust GNNs using universal adversarial training, according to some non-limiting embodiments or aspects.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. An "application" or "application program interface" (API) may refer to computer code or other data sorted on a computer-readable medium that may be executed by a processor to facilitate the interaction between software components, such as a client-side front-end and/or server-side back-end for receiving data from the client. An "interface" may refer to a generated display, such as one or more graphical user interfaces (GUIs) with which a user may interact, either directly or indirectly (e.g., through a keyboard, mouse, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to methods, systems, and computer program products for generating robust GNNs including, but not limited to, using universal adversarial training. For example, non-limiting embodiments or aspects of the disclosed subject matter provide receiving input including a GNN model and a bipartite graph including an adjacency matrix determined from an interaction matrix, initializing model parameters of the GNN model based on a Bayesian Personalized Ranking (BPR) loss, initializing perturbation parameters randomly, determining a complementary graph based on the bipartite graph, sampling a subgraph of the complementary graph, and, until convergence of the model parameters, repeatedly drawing a random variable from a uniform distribution, generating a universal perturbation matrix based on the subgraph, the random variable, and the perturbation parameters, determining BPR loss by inputting the bipartite graph and the universal perturbation matrix to the GNN model, updating the perturbation parameters based on stochastic gradient ascent, and updating the model parameters based on stochastic gradient descent. Such embodiments or aspects provide numerous technical advantages and improvements in systems for generating robust GNNs using universal adversarial training. For example, such techniques provide for improving the performance (e.g., accuracy, efficiency, etc.) of GNN model training, testing, and execution. Additionally, such techniques reduce computer system requirements (e.g., processing capacity, required memory storage, processing time, bandwidth, etc.) that are required to produce the same quality of performance of GNNs as those of existing systems. Moreover, by employing adversarial training using the method described herein (e.g., perturbations based on the perturbation matrix and/or perturbation parameters, as iteratively updated), the GNN model may be made to be resilient to perturbations without the need to employ additional computer resources to account for perturbations after GNN model generation and/ or training. Furthermore, since perturbations (e.g., additions, modifications, deletions, etc. of graph edges) may be caused by data collection errors, data storage errors, data processing errors, malicious attacks, and/or the like, the techniques described herein improve the overall performance of computer-implemented GNN systems by producing a robust GNN model that is resilient to such technical defects. GNN models produced according to non-limiting embodiments and aspects of the present disclosure will outperform GNN models produced without the described training techniques, when in the presence of the same kinds of perturbations.

GNNs, such as graph convolutional networks (GCNs), may be powerful for collaborative filtering. For example, GCNs may be used to explore neighborhood aggregation mechanisms to extract high-level representations of users and items. Real-world user-item graphs may be incomplete and noisy, which may lead to suboptimal performance and misleading neighborhood information. In some non-limiting embodiments or aspects, the systems and methods described herein may use adversarial training to properly regularize GCNs and overcome such problems with incomplete and noisy user-item graphs.

GNNs, without such adversarial training, may be vulnerable to adversarial perturbations, in which small, unnoticeable perturbations on nodes' features or graph structures may significantly reduce the performance of the GNN. In some non-limiting embodiments or aspects, the systems and methods described herein may model adversarial graph perturbations during the training stage of GNNs to improve model performance. Such systems and methods may use min-max robust optimization, in which a universal graph perturbation matrix is obtained through an inner maximization problem, and an outer optimization aims to compute the model parameters of a GNN model. Furthermore, such systems and methods address the challenges of optimizing the inner maximization problem (due to the discrete nature of graph perturbations) by constructing a continuous relaxation of the discrete optimization, and further using an unbiased gradient estimator to compute the gradient of discrete variables. These techniques enhance the generalization performance of GNN-based recommender systems. Moreover, the described systems and methods are compatible with GNN models without changing their architectures.

Referring now to FIG. 1, a system 100 for generating robust GNNs using universal adversarial training is shown, according to some non-limiting embodiments or aspects. Specifically, the system 100 may include modeling system 102, user device 106, memory 110, and a communication network 108.

Modeling system 102 may include one or more computing devices configured to communicate with user device 106 and/or memory 110, including at least partly over the communication network 108. In some non-limiting embodiments or aspects, modeling system 102 may be associated with or included in a transaction processing system. Modeling system 102 may further be associated with or include memory 110. Modeling system 102 may further be associated with or include user device 106. Modeling system 102 may include one or more servers. Modeling system 102 may include at least one processor and at least one non-transitory computer readable storage medium including program instructions that, when executed, cause the at least one processor to perform the methods of the present disclosure.

User device 106 may include one or more computing devices configured to communicate with modeling system 102 and/or memory 110, including at least partly over the communication network 108. User device 106 may include at least one processor and at least one non-transitory computer readable storage medium including program instructions that, when executed, cause the at least one processor to transmit/select input and/or receive/view output of the methods of the present disclosure.

Memory 110 may include one or more computing devices configured to communicate with modeling system 102 and/ or user device 106, including at least partly over the communication network 108. Memory 110 may include at least one processor and at least one non-transitory computer readable storage medium including program instructions that, when executed, cause the at least one processor to store and/or communicate GNN model data, interaction matrices, GNN model recommendations/categorizations, GNN model parameters, and/or the like.

Communication network 108 may include one or more wired and/or wireless networks. For example, communication network 108 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

In some non-limiting embodiments or aspects, modeling system 102 may perform one or more steps of a method for generating robust GNNs using universal adversarial training. For example, modeling system 102 may receive input including a GNN model and a bipartite graph including an adjacency matrix determined from an interaction matrix. The input may also include a perturbations budget that specifies a number of edges of the subgraph. The input may further include a first regularized parameter, a second regularized parameter, and/or a third regularized parameter. Modeling system 102 may also initialize model parameters of the GNN model based on a BPR loss. Modeling system 102 may further initialize perturbation parameters randomly and determine a complementary graph based on the bipartite graph. Modeling system 102 may further sample a subgraph of the complementary graph.

In some non-limiting embodiments or aspects, modeling system 102 may repeat a process until convergence of the model parameters. In the repeated process, modeling system 102 may draw a random variable from a uniform distribution, generate a universal perturbation matrix based on the subgraph, the random variable, and the perturbation parameters, determine BPR loss by inputting the bipartite graph and the universal perturbation matrix to the GNN model, update the perturbation parameters based on stochastic gradient ascent, and update the model parameters based on stochastic gradient descent, which may be further based at least partly on BPR loss. In response to convergence of the model parameters, modeling system 102 may output the model parameters. In response to convergence of the model parameters, modeling system 102 may generate at least one recommendation based on the interaction matrix by executing the GNN model using the model parameters.

In some non-limiting embodiments or aspects, modeling system 102 may determine the BPR loss based on the first regularized parameter to prevent overfitting. When modeling system 102 generates the universal perturbation matrix, an effect of adversarial perturbations of the universal perturbation matrix on the BPR loss may be limited by the second regularized parameter. Modeling system 102 may generate the universal perturbation matrix as a sparse graph by using a learnable binary mask that is weighted with the third regularized parameter. Modeling system 102 may further generate the universal perturbation matrix based on a sigmoid function of the perturbation parameters.

In some non-limiting embodiments or aspects, the interaction matrix may include a user-item interaction matrix. The GNN model may be trained to generate at least one item recommendation for at least one user based on the user-item interaction matrix.

In some non-limiting embodiments or aspects, modeling system 102 may identify an interaction matrix, e.g., a user-item interaction matrix. A user-item interaction matrix may be represented by:

$$R \in \mathbb{R}^{|\mathcal{U}| \times |\mathcal{I}|} \qquad \text{Formula 1}$$

where $\mathcal{U}$ represents the number of users, $|\mathcal{I}|$ represents the number of items, and R represents a relationship matrix, where $R_{ui}=1$ if user u has interacted with item i before, and $R_{ui}=0$ if user u has not interacted with item i before. Modeling system 102 may denote a general interaction matrix by substituting a first set of nodes M for "$\mathcal{U}$" and a second set of nodes N for "$\mathcal{I}$", such that relationships between the first set of nodes M and the second set of nodes N may be modeled. For example, a relationship between node m (representing a first entity) and node n (representing a second entity) may be modeled as $R_{mn}$, where $R_{mn}=1$ if a relationship exists between node m and node n, and $R_{mn}=0$ if a relationship does not exist between node m and node n.

Modeling system 102 may determine a corresponding adjacency matrix of the interaction matrix as follows:

$$A = \begin{bmatrix} 0 & R \\ R^\top & 0 \end{bmatrix} \qquad \text{Formula 2}$$

where A is the adjacency matrix, and RT is the transposition of the relationship matrix R. Modeling system 102 may use the adjacency matrix in a GNN with the goal of producing a recommendation, e.g., a ranked list of items for which a user had no prior interactions, such as by performing link prediction on the bipartite graph.

In some non-limiting embodiments or aspects, modeling system 102 may use a GNN model to iteratively update the representation of each node by aggregating messages over each node's neighbors. Modeling system 102 may use a message-passing schema represented as:

$$H^{(l)} = f_{agg}(H^{(l-1)}, A) \qquad \text{Formula 3}$$

where $H^{(l)}$ represents the nodes' embeddings at the l-th layer, in which $H^{(0)}$ may be initialized with identifier (ID) embeddings via lookup tables, and where $F_{agg}^{(\cdot)}$ is a differentiable aggregation function.

After L layers, modeling system 102 may use a readout function to generate the final embeddings for each node v, which may be annotated as:

$$h_v = f_{readout}(\{h_v^{(l)}, 0 \leq l \leq L\}) \qquad \text{Formula 4}$$

where $h_v$ represents the final embedding of node v. For example, $f_{readout}(\cdot)$ may be a concatenation function, a weighted sum function, and/or the like. In some non-limiting embodiments or aspects, modeling system 102 may use an inner product to predict how likely it is that user u would interact with item i, which may be represented as:

$$\hat{y}_{ui} = h_u^T h_i \qquad \text{Formula 5}$$

To optimize model parameters, modeling system 102 may employ pairwise Bayesian Personalized Ranking (BPR) loss that encourages the prediction score of an observed entry to be higher than its unobserved counterparts. Modeling system 102 may represent BPR loss as:

$$\mathcal{L}_{BPR}(\Theta) = \sum_{(u,i,j)\in\mathcal{D}} -\ln\sigma(\hat{y}_{ui} - \hat{y}_{uj}) + \alpha\|\Theta\|_F^2, \qquad \text{Formula 6}$$

where $\mathcal{D} = \{(u, i, j)|R_{ui}=1, R_{uj}=0\}$ is the set of pairwise training instances, $\sigma(\cdot)$ is the sigmoid function, $\Theta$ denotes the model parameters, and a is the regularized parameter to prevent overfitting.

In some non-limiting embodiments or aspects, modeling system 102 may inject perturbations to the original graph when training a GNN. As such, Formula 3 may become:

$$H^{(l)} = f_{agg} H^{(l+1)}, A+\Delta), \qquad \text{Formula 7}$$

where $\Delta = \{\Delta_{ij} \in \{0, 1\} \hat{=} \Delta_{ij} \ E \notin A\}$ denotes the universal graph perturbations. Modeling system 102 may use the universal perturbations to improve both robustness and generalization performance in image classification. Modeling system 102 may use adversarial perturbations with the goal of causing the largest influence (e.g., worst-case perturbations). Therefore, modeling system 102 may identify the optimal adversarial perturbations Lady by maximizing the BPR loss as follows:

$$\Delta_{adv} = \underset{\Delta}{\text{argmax}} \mathcal{L}_{BPR}(\hat{\Theta}, A + \Delta), \text{ s.t. } \|\Delta\|_0 \le \delta, \qquad \text{Formula 8}$$

where $\hat{\Theta}$ is a constant denoting the current model parameters. Because adversarial perturbations may be expected to be small, unnoticeable, and non-corrupting of the majority of graph structures, modeling system 102 may thus penalize the number of non-zero entries of $\Delta$ via $L_0$ norm with an upper bound $\delta \le 0$.

In some non-limiting embodiments or aspects, modeling system 102 may use an objective function that is suitable for personalized ranking and is robust to adversarial graph perturbations. To that end, modeling system may minimize the adversarial BP loss by combining Formula 6 and Formula 8, as follows:

$$\mathcal{L}(\Theta) = \mathcal{L}_{BPR}(\Theta) + \beta\mathcal{L}_{BPR}(\Theta, A + \Delta_{adv}), \text{ where} \qquad \text{Formula 9}$$

$$\Delta_{adv} = \underset{\Delta, \|\Delta\|_0 \le \delta}{\text{argmax}} \mathcal{L}_{BPR}(\hat{\Theta}, A + \Delta),$$

where $\beta$ controls the impact of the adversarial perturbations on the BPR loss. In the extreme case, e.g., $\beta=0$, Formula 9 may reduce to Formula 6. The objective of Formula 9 may consist of two steps: 1) an inner maximization that computes the universal perturbations $\Delta^*$ by fixing the model parameters $\Theta$, and 2) an outer minimization that computes the model parameters $\Theta^*$ by fixing the perturbations $\Delta$. The outer minimization may be represented as a GNN optimization problem, and modeling system 102 may learn $\Theta^*$ via Stochastic Gradient Descent. However, because the inner problem is intractable due to the discrete nature of $\Delta$, modeling system 102 may employ continuous relaxation of $\Delta$ via probabilistic reparameterization.

In some non-limiting embodiments or aspects, the $\Delta$ in Formula 8 may contain $2^{|A|}$ possible candidates of edge perturbations. Modeling system 102 may use mask techniques to generate sub-graph perturbations that can be scalable to large graphs. For example, given bipartite graph A, its complementary graph $\overline{A}$ contains all unobserved edges. Modeling system 102 may sample a sub-graph T~($\overline{A}$) with a fixed budget of edges B. Then, modeling system 102 may generate the universal perturbations as: $\Delta=T\odot M$, where $\odot$ denotes the element-wise product and $M \notin \{0, 1\}$ is a learnable binary mask (e.g., 1 is kept and 0 is dropped). As such, modeling system 102 may approximate the inner optimization of Formula 8 as:

$$\underset{M}{\text{max}} \mathcal{L}_{BPR}(\hat{\Theta}, A + T \odot M) - \lambda\|M\|_0, \qquad \text{Formula 10}$$

where the sparsity of $\Delta$ (e.g., $\|\Delta\|0 \le \delta$) can be achieved by adding $L_0$ regularizer on M with hyperparameter $\lambda \ge 0$. Formula 6 may still be intractable since the discrete variable M and the $L_0$ norm are non-differentiable. Modeling system 102 may compute the gradient via the REINFORCE algorithm (e.g., a Monte Carlo Policy gradient), and may reduce the high variance thereof by using an Antithetic REINFORCE-based gradient estimator to solve the inner optimization.

Modeling system 102 may consider each $M_{ij}$ to be drawn from a Bernoulli distribution parameterized by $\Pi_{ij} \in [0, 1]$ such that $M_{ij} \sim \text{Bern} (M_{ij}; \in_{ij})$. Modeling system 102 may then rewrite Formula 10 by its expectation:

$$\underset{\Pi}{\text{max}} \mathbb{E}_{M \sim Bernoulli(M;\Pi)}\left[\mathcal{L}_{BPR}(\hat{\Theta}, A + T \odot M)\right] - \lambda\sum_{i,j}\Pi_{ij}. \qquad \text{Formula 11}$$

To efficiently compute gradients of discrete variable $\Pi$, modeling system 102 may use probabilistic reparameterization to reparametrize $\Pi_{ij} \in [0, 1]$ with a deterministic function $g(\cdot)$, with parameter $\Phi_{ij}$: $=g(\Phi_{ij})$. Since $g(\cdot)$ should be bounded within [0, 1], modeling system 102 may choose the sigmoid function $\sigma(\cdot)$ as the deterministic function. This arrangement provides a number of probability properties. As a first property, given a Bernoulli random variable z~Bernoulli (z; $\sigma(\phi)$), variable z can be represented by comparing two augmented exponential random variables:

$$z = \mathbb{1}\left[xe^{-\phi} < y\right], x, y \overset{i.i.d}{\sim} \text{Exp}(1), \qquad \text{Formula 12}$$

where $\mathbb{1}[\cdot]$ is the indicator function having the value 1 if the condition is true and 0 otherwise. As a second property, for a random variable $z=xe^{-\Phi}$, x~Exp(1), variable z is equal in distribution to $z\sim(\text{Exp}(e^{\Phi}))$. As a third property, for two variables:

$$x, y \overset{i.i.d}{\sim} \text{Exp}(1) \qquad \text{Formula 13}$$

they are the same in distribution as $x=\in u$, $y=\in (1-u)$, where u Uniform(0, 1), $\in$ ~Gamma(2, 1).

With the first property and second property (described above), Formula 11 may be equivalent to:

Formula 14

$$f(\Phi) = \mathbb{E}_{M \sim Bernoulli(M;\sigma(\Phi))}\left[\mathcal{L}_{BPR}(\hat{\Theta}, A + T \odot M)\right] - \lambda \sum_{i,j}\sigma(\Phi_{ij})$$

$$= \mathbb{E}_{\substack{i.i.d \\ X,Y \sim Exp(1)}}\left[\mathcal{L}_{BPR}(\hat{\Theta}, A + T \odot \mathbb{1}\left[X \odot e^{-\Phi} < Y\right])\right] - \lambda \sum_{i,j}\sigma(\Phi_{ij})$$

$$= \mathbb{E}_{Z \sim Exp(e^{\Phi}),Y \sim Exp(1)}\left[\mathcal{L}_{BPR}(\hat{\Theta}, A + T \odot \mathbb{1}\left[Z < Y\right])\right] - \lambda \sum_{i,j}\sigma(\Phi_{ij})$$

Modeling system 102 may compute the gradients with respect to 4). The second term, therefore, is differentiable and its gradient is:

$$c = \lambda\Sigma_{i,j}\nabla\Phi_{ij}\sigma(\Phi_{ij}).$$

Formula 15

Applying the REINFORCE algorithm to the first term in Formula 14, Formula 14 becomes:

Formula 16

$$\nabla_{\Phi}f(\Phi) = \mathbb{E}_{Z \sim Exp(e^{\Phi}),Y \sim Exp(1)}\left[\mathcal{L}_{BPR}(\hat{\Theta}, A + T \odot \mathbb{1}\left[Z < Y\right])\nabla_{\Phi}\log Exp(Z; e^{\Phi})\right] - c$$

$$= \mathbb{E}_{Z \sim Exp(e^{\Phi}),Y \sim Exp(1)}\left[\mathcal{L}_{BPR}(\hat{\Theta}, A + T \odot \mathbb{1}\left[Z < Y\right])(1 - Z \odot e^{\Phi})\right] - c$$

$$= \mathbb{E}_{\substack{i.i.d \\ X,Y \sim Exp(1)}}\left[\mathcal{L}_{BPR}(\hat{\Theta}, A + T \odot \mathbb{1}\left[X \odot e^{-\Phi} < Y\right])(1 - X)\right] - c$$

With the third property (described above), modeling system 102 may express $$X, Y \overset{i.i.d}{\sim} Exp(1)$$

Formula 17 as:

$$X = E \odot U, Y = E \odot (1 - U),$$

Formula 18 where U and E can be drawn from Uniform(0, 1) and Gamma (2, 1), respectively. Accordingly, the inequality in Formula 16 becomes:

$$X \odot e^{-\Phi} < Y \Leftrightarrow U < \sigma(\Phi)$$

Formula 19 and Formula 16 may be expressed as:

Formula 20

$$\nabla_{\Phi}f(\Phi) = \mathbb{E}_{\substack{U \sim Uniform(0,1), \\ E \sim Gamma(2,1)}}\left[\mathcal{L}_{BPR}(\hat{\Theta}, A + T \odot \mathbb{1}\left[U < \sigma(\Phi)\right])(1 - E \odot U)\right] - c$$

Using Rao-Blackwellization, modeling system 102 may further obtain gradients as:

$$\nabla_{\Phi}f(\Phi) = \mathbb{E}_{U \sim Uniform(0,1)}\left[\mathcal{L}_{BPR}(\hat{\Theta}, A + T \odot \mathbb{1}\left[U < \sigma(\Phi)\right])(1 - 2U)\right] - c$$

Formula 21

In view of the above, modeling system 102 may efficiently solve the discrete optimization of Formula 10 via probabilistic reparameterization. The gradient estimator shown above provides a number of technical benefits, including: (i) applying antithetic sampling over augmented variables yields unbiased and low-variance gradients; and (ii) the gradient estimator has low computational complexity, in that sampling from a Bernoulli distribution is replaced by a non-parametric Uniform distribution, and the gradients in Formula 21 only involve one forward-pass of networks.

In non-limiting embodiments or aspects, modeling system 102 may iteratively updated $\Delta$ and $\Theta$. First, modeling system 102 may receive an input of GNN $f_{gnn}$, bipartite graph A, perturbations budget B, regularized parameters $\alpha$ and $\beta$ for Formula 9, and regularized parameter $\lambda$ for Formula 11. Modeling system 102 may then initialize $\Theta$ by solving the original BPR loss of Formula 6. Next, modeling system 102 may initialize $\phi$ randomly. Modeling system 102 may then sample a sup-graph T~($\overline{A}$) with budget B. Next, modeling system 102 may repeated perform a process until convergence, wherein the process includes: drawing U~Uniform(0, 1); computing universal perturbations $\phi$=T$\odot$1 [U<$\sigma(\phi)$]; feeding (A, $\Delta$) to the GNN $f_{gnn}$ and computing the loss in Formula 9; updating $\phi$ with stochastic gradient ascent as shown in Formula 21, such that $\phi \leftarrow +\eta_1 \cdot \nabla_{\phi}f(\phi)$ and updating $\Theta$ with stochastic gradient descent as shown in Formula 9, such that $\Theta \leftarrow \Theta\eta_2 \cdot \leftarrow \mathcal{L}(\Theta)$. Modeling system 102 may repeat this process may be repeated until convergence of the model parameters $\Theta$. After convergence, modeling system 102 may return the model parameters $\Theta$.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
FIG. 2 is a diagram of one or more components, devices, and/or systems, according to some non-limiting embodiments or aspects.
Figure 2:
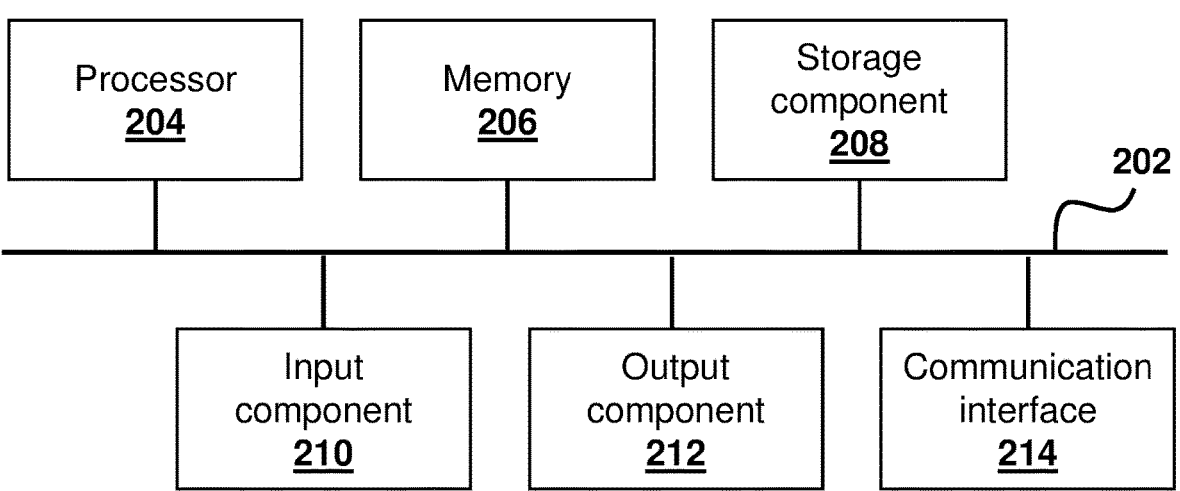

Referring now to FIG. 2, shown is a diagram of example components of a device 200, according to some non-limiting embodiments or aspects. Device 200 may correspond to one or more devices of modeling system 102, user device 106, memory 110, and/or communication network 108, as shown in FIG. 1. In some non-limiting embodiments or aspects, such systems or devices may include at least one device 200 and/or at least one component of device 200. The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software. The term "programmed or configured," as used herein, refers to an arrangement of software, hardware circuitry, or any combination thereof on one or more devices.

Figure 3:
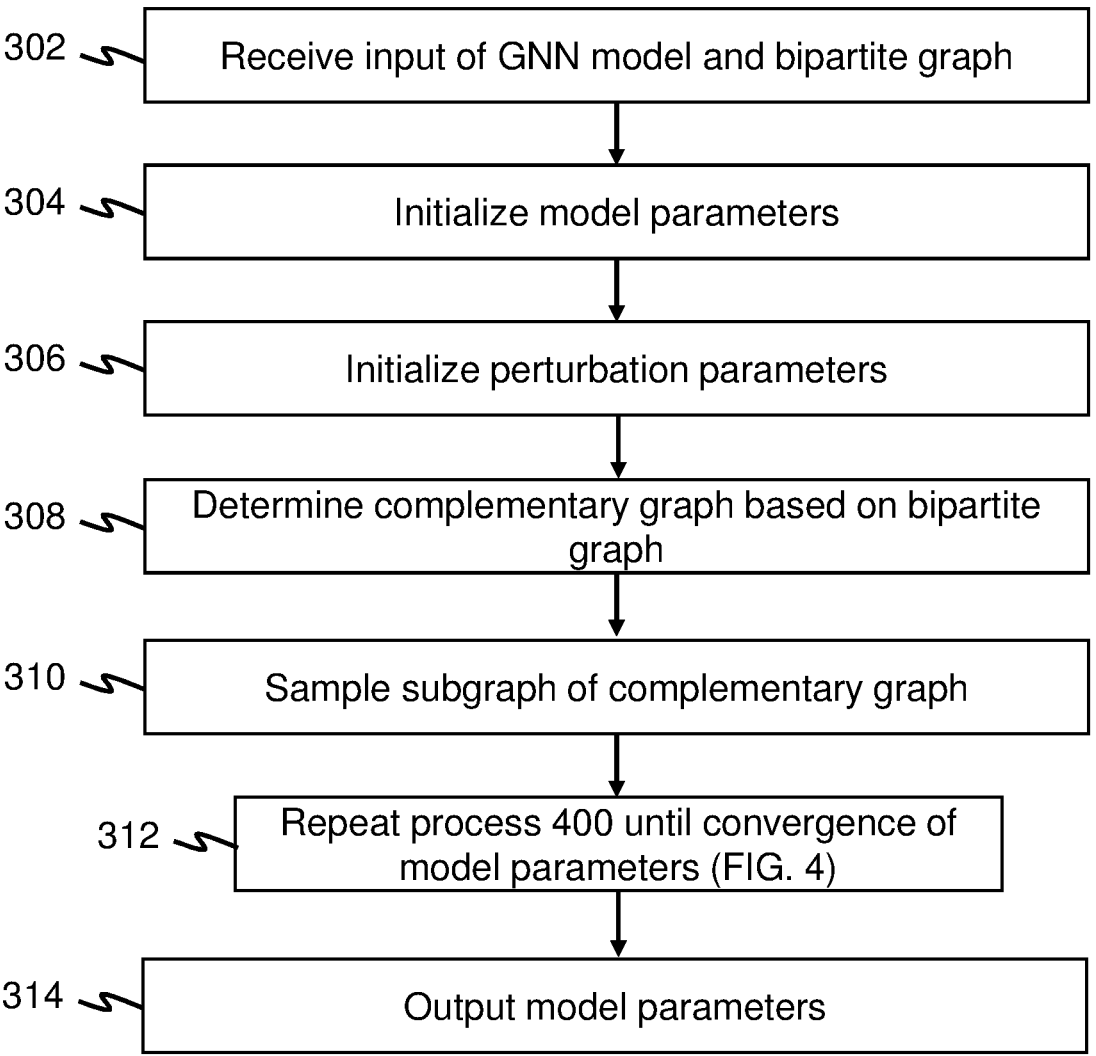
FIG. 3 is a flow diagram of a method for generating robust GNNs using universal adversarial training, according to some non-limiting embodiments or aspects.

Referring now to FIG. 3, a flow diagram of a method 300 for generating robust GNNs using universal adversarial training is shown, according to some non-limiting embodiments or aspects of the present disclosure. The method 300 may be performed by one or more processors of modeling system 102, user device 106, memory 110, and/or another computing device. One or more steps performed by a first processor may be performed by a same or different processor. The steps shown in FIG. 3 are for example purposes only. It will be appreciated that additional, fewer, different, and/or a different order of steps may be used in non-limiting embodiments or aspects.

As shown in FIG. 3, method 300 may include, in step 302, receiving input of a GNN model and a bipartite graph. For example, modeling system 102 may receive input including a GNN model and a bipartite graph including an adjacency matrix determined from an interaction matrix.

In some non-limiting embodiments or aspects, the interaction matrix may include a user-item interaction matrix generated from historic interactions between users and items (e.g., products, services, transactions, internet resources, etc.).

In some non-limiting embodiments or aspects, the GNN model may be trained to generate at least one item recommendation for at least one user based on the user-item interaction matrix.

In some non-limiting embodiments or aspects, the input may further include a perturbations budget, a first regularized parameter, a second regularized parameter, a third regularized parameter, or any combination thereof.

As shown in FIG. 3, method 300 may include, in step 304, initializing model parameters. For example, modeling system 102 may initialize model parameters of the GNN model based on a Bayesian Personalized Ranking (BPR) loss. BPR loss may be based on the first regularized parameter, e.g., to prevent overfitting.

As shown in FIG. 3, method 300 may include, in step 306, initializing perturbation parameters. For example, modeling system 102 may initialize perturbation parameters randomly.

As shown in FIG. 3, method 300 may include, in step 308, determining a complementary graph based on the bipartite graph. For example, modeling system 102 may determine the complementary graph based on the bipartite graph. In some non-limiting embodiments or aspects, the complementary graph may be generated based on the adjacency matrix of the bipartite graph (e.g., the complementary graph may include all unobserved edges from the bipartite graph).

As shown in FIG. 3, method 300 may include, in step 310, sampling a subgraph of the complementary graph. For example, modeling system 102 may sample a subgraph of the complementary graph.

In some non-limiting embodiments or aspects, the perturbations budget may specify a number of edges of the subgraph.

As shown in FIG. 3, method 300 may include, in step 312, repeating method 400 (shown in FIG. 4) until convergence of model parameters. For example, these repeated steps may include the steps shown in method 400 of FIG. 4.

As shown in FIG. 3, method 300 may include, in step 314, outputting the model parameters. For example, in response to convergence of the model parameters, modeling system 102 may output the model parameters.

In some non-limiting embodiments or aspects, modeling system 102 may generate at least one recommendation based on the interaction matrix by executing the GNN model using the model parameters.

Figure 4:
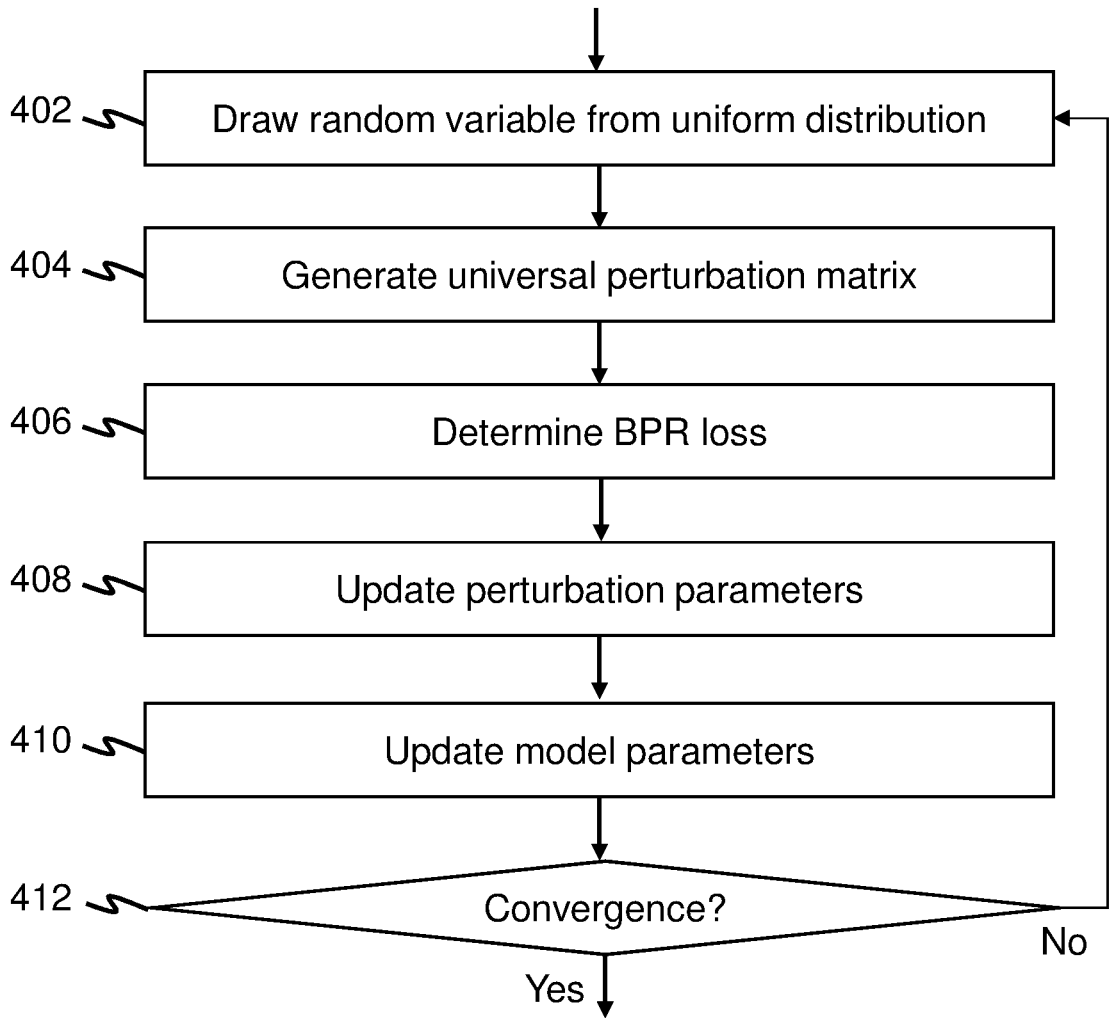
FIG. 4 is a flow diagram of a method for generating robust GNNs using universal adversarial training, according to some non-limiting embodiments or aspects.

Referring now to FIG. 4, a flow diagram of a method 400 for generating robust GNNs using universal adversarial training is shown, according to some non-limiting embodiments or aspects of the present disclosure. The method 400 may be performed by one or more processors of modeling system 102, user device 106, memory 110, and/or another computing device. One or more steps performed by a first processor may be performed by a same or different processor. The steps shown in FIG. 4 are for example purposes only. It will be appreciated that additional, fewer, different, and/or a different order of steps may be used in non-limiting embodiments or aspects.

In some non-limiting embodiments or aspects, steps 402-410 may be repeated until convergence of the model parameters. Additionally or alternatively, step 402 may be executed after execution of step 310 of the method 300 detailed in FIG. 3.

As shown in FIG. 4, method 400 may include, in step 402, drawing a random variable from a uniform distribution. For example, modeling system 102 may draw a random variable from a uniform distribution.

As shown in FIG. 4, method 400 may include, in step 404, generating a universal perturbation matrix. For example, modeling system 102 may generate a universal perturbation matrix based on the subgraph, the random variable, and the perturbation parameters.

In some non-limiting embodiments or aspects, the universal perturbation matrix may also be generated as a sparse graph by using a learnable binary mask that is weighted with the third regularized parameter. Additionally or alternatively, the universal perturbation matrix may be further generated based on a sigmoid function of the perturbation parameters.

As shown in FIG. 4, method 400 may include, in step 406, determining BPR loss. For example, modeling system 102 may determine BPR loss by inputting the bipartite graph and the universal perturbation matrix to the GNN model.

In some non-limiting embodiments or aspects, the effect of adversarial perturbations of the universal perturbation matrix on the BPR loss may be limited by the second regularized parameter.

As shown in FIG. 4, method 400 may include, in step 408, updating the perturbation parameters. For example, modeling system 102 may update the perturbation parameters based on stochastic gradient ascent.

As shown in FIG. 4, method 400 may include, in step 410, updating the model parameters. For example, modeling system 102 may update the model parameters based on stochastic gradient descent.

In some non-limiting embodiments or aspects, the stochastic gradient descent may be further based at least partly on BPR loss.

As shown in FIG. 4, method 400 may include, in step 412, evaluating the model parameters for convergence. For example, modeling system 102 may evaluate the model parameters for convergence (e.g., a local extrema, a change between iterations that is less than a threshold, and/or the like).

In response to determining that the model parameters have not yet converged, modeling system 102 may proceed to re-executing steps 402-410. In response to determining that the model parameters have converged, modeling system 102 may exit the loop and proceed to step 314 of FIG. 3.

With further reference to the foregoing figures, "electronic payment processing network" may refer to a plurality computing devices that transmit and/or receive communications between one or more entities for processing the transfer of monetary funds to one or more transactions. The electronic payment processing network may include a merchant system, an acquirer system, a transaction service provider system, and an issuer system.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect, and one or more steps may be taken in a different order than presented in the present disclosure.

What is claimed is:

1. A computer-implemented method comprising:
receiving, with at least one processor, input comprising a graph neural network (GNN) model and a bipartite graph comprising an adjacency matrix determined from an interaction matrix;
initializing, with at least one processor, model parameters of the GNN model based on a Bayesian Personalized Ranking (BPR) loss;
initializing, with at least one processor, perturbation parameters randomly;
determining, with at least one processor, a complementary graph based on the bipartite graph, the complementary graph comprising unobserved edges from the bipartite graph;
sampling, with at least one processor, a subgraph of the complementary graph based on a perturbations budget specifying a number of edges of the subgraph;
repeating, with at least one processor, until convergence of the model parameters:
drawing a random variable from a uniform distribution;
generating a universal perturbation matrix based on the subgraph, the random variable, and the perturbation parameters, wherein the universal perturbation matrix is associated with edge perturbations in the subgraph;
determining updated BPR loss by inputting the bipartite graph and the universal perturbation matrix to the GNN model;
updating the perturbation parameters based on stochastic gradient ascent; and
updating the model parameters based on stochastic gradient descent, wherein the stochastic gradient descent is based at least partly on the updated BPR loss; and
in response to convergence of the model parameters, outputting, with at least one processor, the model parameters.

2. The computer-implemented method of claim 1, further comprising, in response to convergence of the model parameters, generating, with at least one processor, at least one recommendation based on the interaction matrix by executing the GNN model using the model parameters.

3. The computer-implemented method of claim 1, wherein the input further comprises the perturbations budget.

4. The computer-implemented method of claim 1, wherein the input further comprises a first regularized parameter, and wherein the BPR loss is based on the first regularized parameter to prevent overfitting.

5. The computer-implemented method of claim 1, wherein the input further comprises a second regularized parameter, and wherein an effect of adversarial perturbations of the universal perturbation matrix on the BPR loss is limited by the second regularized parameter.

6. The computer-implemented method of claim 1, wherein the input further comprises a third regularized parameter, and wherein the universal perturbation matrix is generated as a sparse graph by using a learnable binary mask that is weighted with the third regularized parameter.

7. The computer-implemented method of claim 1, wherein the interaction matrix comprises a user-item interaction matrix, and wherein the GNN model is trained to generate at least one item recommendation for at least one user based on the user-item interaction matrix.

8. The computer-implemented method of claim 1, wherein the generation of the universal perturbation matrix is further based on a sigmoid function of the perturbation parameters.

9. A system comprising at least one processor, the at least one processor being programmed or configured to:

receive input comprising a graph neural network (GNN) model and a bipartite graph comprising an adjacency matrix determined from an interaction matrix;

initialize model parameters of the GNN model based on a Bayesian Personalized Ranking (BPR) loss;

initialize perturbation parameters randomly;

determine a complementary graph based on the bipartite graph, the complementary graph comprising unobserved edges from the bipartite graph;

sample a subgraph of the complementary graph based on a perturbations budget specifying a number of edges of the subgraph;

repeat until convergence of the model parameters:

draw a random variable from a uniform distribution;

generate a universal perturbation matrix based on the subgraph, the random variable, and the perturbation parameters, wherein the universal perturbation matrix is associated with edge perturbations in the subgraph;

determine updated BPR loss by inputting the bipartite graph and the universal perturbation matrix to the GNN model;

update the perturbation parameters based on stochastic gradient ascent; and update the model parameters based on stochastic gradient descent, wherein the stochastic gradient descent is based at least partly on the updated BPR loss; and in response to convergence of the model parameters, output the model parameters.

10. The system of claim 9, wherein the at least one processor is further programmed or configured to, in response to convergence of the model parameters, generate at least one recommendation based on the interaction matrix by executing the GNN model using the model parameters.

11. The system of claim 9, wherein the input further comprises the perturbations budget.

12. The system of claim 9, wherein the input further comprises a first regularized parameter, and wherein the BPR loss is based on the first regularized parameter to prevent overfitting.

13. The system of claim 9, wherein the input further comprises a second regularized parameter, and wherein an effect of adversarial perturbations of the universal perturbation matrix on the BPR loss is limited by the second regularized parameter.

14. The system of claim 9, wherein the input further comprises a third regularized parameter, and wherein the universal perturbation matrix is generated as a sparse graph by using a learnable binary mask that is weighted with the third regularized parameter.

15. The system of claim 9, wherein the interaction matrix comprises a user-item interaction matrix, and wherein the GNN model is trained to generate at least one item recommendation for at least one user based on the user-item interaction matrix.

16. The system of claim 9, wherein the generation of the universal perturbation matrix is further based on a sigmoid function of the perturbation parameters.

17. A computer program product comprising at least one non-transitory computer-readable medium including one or more instructions that, when executed by at least one processor, cause the at least one processor to:

receive input comprising a graph neural network (GNN) model and a bipartite graph comprising an adjacency matrix determined from an interaction matrix;

initialize model parameters of the GNN model based on a Bayesian Personalized Ranking (BPR) loss;

initialize perturbation parameters randomly;

determine a complementary graph based on the bipartite graph, the complementary graph comprising unobserved edges from the bipartite graph;

sample a subgraph of the complementary graph based on a perturbations budget specifying a number of edges of the subgraph;

repeat until convergence of the model parameters:

draw a random variable from a uniform distribution;

generate a universal perturbation matrix based on the subgraph, the random variable, and the perturbation parameters, wherein the universal perturbation matrix is associated with edge perturbations in the subgraph;

determine updated BPR loss by inputting the bipartite graph and the universal perturbation matrix to the GNN model;

update the perturbation parameters based on stochastic gradient ascent; and update the model parameters based on stochastic gradient descent, wherein the stochastic gradient descent is based at least partly on the updated BPR loss; and in response to convergence of the model parameters, output the model parameters.

18. The computer program product of claim 17, wherein the one or more instructions cause the at least one processor to, in response to convergence of the model parameters, generate at least one recommendation based on the interaction matrix by executing the GNN model using the model parameters.

19. The computer program product of claim 17, wherein the input further comprises the perturbations budget.

20. The computer program product of claim 17, wherein the input further comprises a first regularized parameter, and wherein the BPR loss is based on the first regularized parameter to prevent overfitting.

21. The computer program product of claim 17, wherein the input further comprises a second regularized parameter, and wherein an effect of adversarial perturbations of the universal perturbation matrix on the BPR loss is limited by the second regularized parameter.

22. The computer program product of claim 17, wherein the input further comprises a third regularized parameter, and wherein the universal perturbation matrix is generated as a sparse graph by using a learnable binary mask that is weighted with the third regularized parameter.

23. The computer program product of claim 17, wherein the interaction matrix comprises a user-item interaction matrix, and wherein the GNN model is trained to generate at least one item recommendation for at least one user based on the user-item interaction matrix.

24. The computer program product of claim 17, wherein the generation of the universal perturbation matrix is further based on a sigmoid function of the perturbation parameters.

* * * * *